United States Patent [19]
Boerger

[11] Patent Number: 6,050,596
[45] Date of Patent: Apr. 18, 2000

[54] AIR BAG SAFETY DEVICE

[76] Inventor: Freida Boerger, P.O. Box 56618, Jacksonville, Fla. 32241-6618

[21] Appl. No.: 09/072,842
[22] Filed: May 5, 1998

Related U.S. Application Data
[60] Provisional application No. 60/045,624, May 5, 1997.
[51] Int. Cl.[7] .................................................. B60R 21/24
[52] U.S. Cl. ........................ 280/729; 280/743.1; 280/742
[58] Field of Search ................................ 280/728.1, 729, 280/743.1, 742, 740

[56] References Cited

U.S. PATENT DOCUMENTS

| | | |
|---|---|---|
| 3,752,501 | 8/1973 | Daniel et al. ............................ 280/729 |
| 3,791,666 | 2/1974 | Shibamoto .............................. 280/729 |
| 3,907,327 | 9/1975 | Pech ....................................... 280/729 |
| 5,174,601 | 12/1992 | Frantz et al. ........................... 280/740 |
| 5,338,061 | 8/1994 | Nelson et al. .......................... 280/729 |
| 5,372,381 | 12/1994 | Herridge ............................. 280/743.1 |
| 5,427,410 | 6/1995 | Shiota et al. ........................... 280/729 |
| 5,577,765 | 11/1996 | Takeda et al. .......................... 280/729 |
| 5,593,179 | 1/1997 | Maruyama ............................. 280/740 |
| 5,599,041 | 2/1997 | Turnbull et al. ....................... 280/729 |

Primary Examiner—Peter C. English
Assistant Examiner—Ruth Ilan
Attorney, Agent, or Firm—Thomas C. Saitta

[57] ABSTRACT

An automatically inflatable air bag for protection of vehicle occupants during collisions, the bag having an exterior or forward compartment and interior or rearward compartment, where the exterior compartment is inflated first.

5 Claims, 3 Drawing Sheets

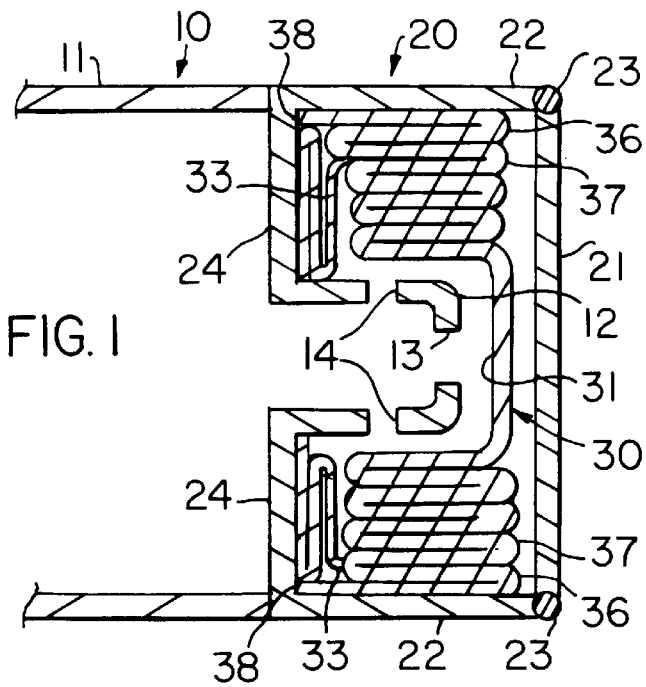
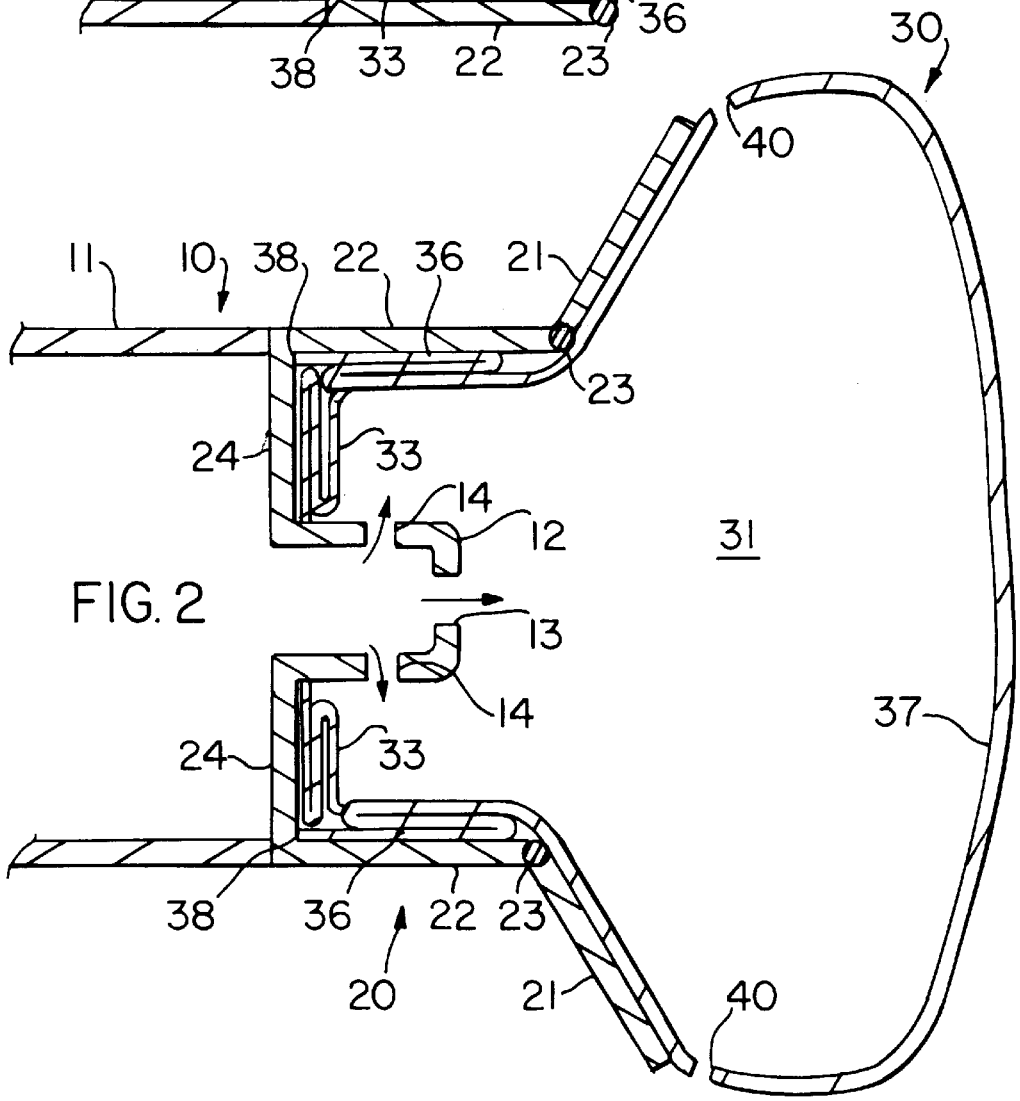

AIR BAG SAFETY DEVICE

This application claims the benefit of U.S. Provisional Application No. 60/045,624, filed May 5, 1997.

BACKGROUND OF THE INVENTION

This invention relates generally to the field of vehicle occupant restraint systems, commonly known as air bags, which inflate when a collision of sufficient force occurs, and more particularly to the field of air bags having multiple compartments. Even more particularly, the invention relates to such air bags where the compartments inflate in a sequential manner.

Vehicle occupant air bags in automobiles and other passenger vehicles which inflate substantially instantaneously upon the occurrence of a vehicle impact of sufficient force, such as would be encountered in an accident, are well known. The air bags are mounted into the vehicle interior compartment within the steering wheel, dashboard, side door panels and other locations in a housing which is generally unobtrusive both physically and aesthetically. Upon impact, inflation gas under pressure is created or released to instantaneously inflate the air bag into a large configuration which extends outward from the housing to provide a cushion between the occupant and the interior components of the vehicle.

It is an object of this invention to provide an improved construction and design for a multiple compartment air bag whereby the inflation sequence and deflation sequence are controlled to maximize the safety and efficacy of the air bag.

SUMMARY OF THE INVENTION

The invention is an inflatable passenger restraint system for an automobile or other vehicle, which is commonly known as an air bag. The air bag is positioned in front or to the side of the vehicle driver or passenger inside a housing in a deflated, folded manner, most commonly being incorporated into the dashboard or steering wheel. Should the vehicle impact an object with sufficient force, the air bag is substantially instantly inflated by gas from a pressurized reservoir or other expanding gas source to create a cushion between the person and the dashboard, steering wheel or vehicle door which absorbs the force of impact. The air bag is provided with rapid deflation means to allow the gas to be expelled after impact from the person.

The air bag safety device of the invention comprises in general the air bag itself, a source of expanding or pressurized gas, means to deliver the gas to the air bag in order to inflate the bag, and a housing to retain the air bag in a folded configuration prior to inflation, the housing having a door, panel or other sealing member which is forced open upon inflation to release the air bag. The air bag is formed of a flexible sheet material capable of being inflated by the gas, and comprises at least two separate compartments or chambers, an exterior compartment disposed farthest from the gas source and closest to the passenger when in the inflated configuration, and an interior compartment more proximate to the gas source and more distant from the passenger when in the inflated configuration, the two compartments defined by an internal divider or partition member having a central orifice or multiple orifices for passage of the gas during inflation. The gas delivery means includes an inflation nozzle, port or projection, preferably with a forward aperture and lateral apertures, and the orifice of the partition member is sized to correspond closely to the external diameter or configuration of the nozzle.

The air bag in the deflated state is stored within the housing in a folded configuration, with the wall of the interior section folded and compressed internally so as to surround the nozzle and such that the nozzle extends through the orifice in the partition member. The wall of the exterior compartment is likewise folded to fit within the housing. Because the apertures in the nozzle initially communicate with the exterior compartment only, upon impact and release the gas will first inflate the exterior compartment of the air bag. As the exterior compartment inflates, the door panel is forced open and the exterior compartment fills and expands. As this happens, the pressure against the housing causes the partition member to be pulled forward off of the nozzle, such that the lateral apertures in the nozzle and subsequently the forward aperture inflate the interior compartment. In this manner both compartments are inflated generally sequentially. The exterior compartment provides the initial protection at impact, with the interior compartment providing secondary or additional protection.

The air bag walls are provide with deflation vent ports or burstable seams to allow the gas to be expelled from the air bag after being contacted by the person, thus softening the impact and providing for better cushioning. Because the exterior compartment inflates first, either completely or substantially completely, there is adequate protection immediately. The interior compartment, having inflated after the exterior compartment, provides protection for multiple impacts.

BRIEF DESCRIPTION OF THE DRAWINGS

FIG. 1 is a cross-sectional view of the air bag of the invention in the folded storage state prior to impact.

FIG. 2 is a cross-sectional view of the air bag as inflation gas is initially introduced into the exterior compartment after a vehicle impact.

DETAILED DESCRIPTION OF THE INVENTION

Figure 3:
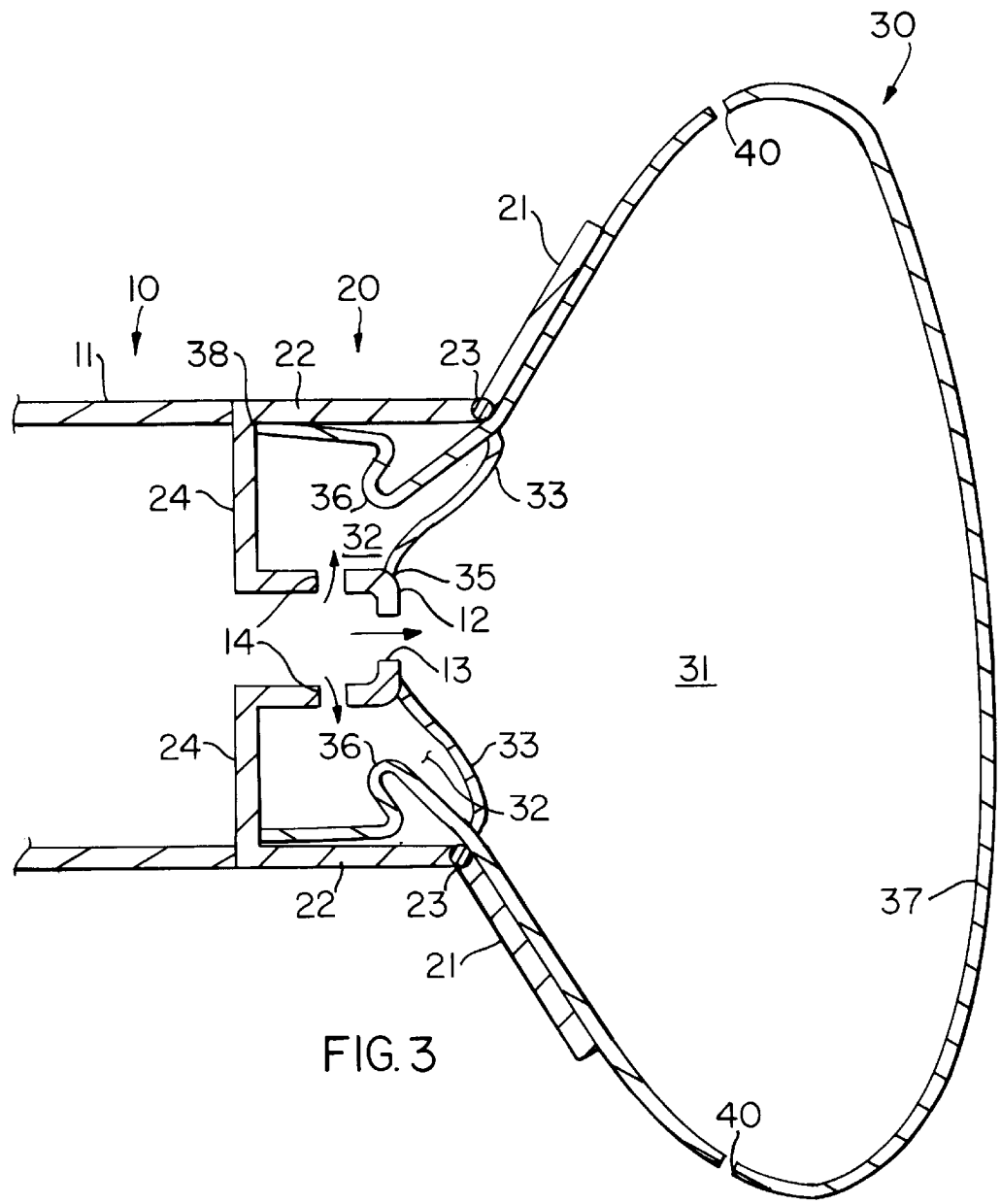
FIG. 3 is a cross-sectional view of the air bag as the inflated exterior bag pulls the partition member past the lateral nozzle, apertures and the interior compartment begins to inflate.

With reference to the accompanying drawings, the invention will now be described with regard for the best mode and the preferred embodiment. In general, the invention is an inflatable vehicle passenger protection apparatus or device known as an air bag, and comprises an inflatable air bag 30, gas delivery means 10 to inflate the air bag 30, and a housing 20 to retain the air bag 30 in a folded configuration in the passive state. Such devices are well known in the vehicle art, and many different and adequate mechanisms for sensing a vehicle impact of predetermined force and inflating the air bag 30 in an almost instantaneous manner are known. Upon sensing an impact, pressurized gas contained or created within a reservoir 11 is delivered through a conduit or nozzle means 12 into the air bag 30, which expands from its housing 20 mounted within the dashboard, steering wheel or side doors of the vehicle. The inflated air bag 30 fills the void between the person and the vehicle dashboard, steering wheel or door, such that the person's forward or lateral momentum is halted by impact with the inflated air bag 30 before the dashboard, wheel or door itself can be struck. The air bag 30 is provided with rapid deflation means 40, such as vent ports, which allows the gas within the inflated bag to be expelled when struck by the person to soften the impact, thereby deflating the air bag 30 and allowing the person to escape or be removed from the vehicle. Most of the known air bag sensing means and pressurized gas reservoir means are suitable for use with the air bag 30 as described herein, and as such the teachings related to these mechanisms are incorporated by reference.

Referring now to FIG. 1, the invention is seen to comprise gas delivery means 10 which includes a source or reservoir of inflation gas 11 and a projection or inflation nozzle, spout or port 12 which extends forward toward the passenger, the forward direction being taken herein to be in the direction toward the person in the vehicle to be restrained in the event of a collision, i.e, in the main direction of expansion into the interior of the vehicle. The gas reservoir or source means 11 is mounted internally to the dashboard, steering wheel or door so as to be hidden. The gas delivery means 10 communicates with the impact sensing means, not shown, such that upon activation the inflation gas within the reservoir 11 is delivered relatively instantaneously through nozzle 12 and into the air bag 30. The pressure of the gas is sufficient to fully inflate the air bag 30 immediately in sufficient time to provide a safe cushion to the person to absorb the force of impact and to prevent contact between the person and the more rigid structural components of the vehicle. The air bag 30 is maintained in the stored or passive condition within a housing 20, configured to unobtrusively blend into the interior decor of the vehicle. The air bag housing 20 has a rear wall 24 and side walls 22 which act to direct inflation of the air bag 30 in the forward direction by restricting any rearward or lateral movement. The forward wall of the housing 20 is comprised of a panel or door member 21, which may be sectioned to form multiple flaps. The panel member 21 is designed so as to disconnect from the side walls 22 of the housing 20 upon inflation of the air bag 30, and the panel member 21 may be attached by hinges 23 to facilitate this movement, thus allowing the air bag 30 to expand forward and outwardly into the fully expanded state.

The inflation nozzle 12 extends through the rear wall 24 of the housing 20 and may comprise a simple port or opening but preferably comprises at least one forward aperture 13 and at least one but preferably multiple lateral apertures 14, which provide for passage of the inflation gas into the interior of the air bag 30. The nozzle 12 is preferably circular in cross-section, but may have other cross-sectional configurations. The nozzle 12 is generally centrally located within the rear wall 24 of housing 20 relative to the air bag 30.

The air bag 30 is formed of a flexible sheet material generally impervious to the inflation gas such that it is capable of retaining the gas so as to become inflated. The sheet material is formed by stitching, adhesives or other suitable means into a three dimensional shape having a thickness which when inflated provides the cushioning to stop the momentum of the person in a collision. The particular inflated configuration of the air bag 30 is a matter of design choice relative to its intended function, and may be generally rectangular, square, circular, triangular or any other suitable shape. The air bag 30 has a non-sealed end 38 connected to the housing 20 which defines the opening to receive the inflation gas. Such materials, methods of construction and connection means are well known in the art. The air bag 30 comprises a divider or partition wall member 33 also made preferably of a flexible, gas impervious sheet material, but which may be composed of a gas permeable material as well to assist in inflation and deflation. The partition member 33 divides the air bag 30 into an exterior or forward chamber or compartment 31 and an interior or rearward chamber or compartment 32, such that the exterior of the air bag 30 comprises exterior walls 37 surrounding the exterior compartment 31 and interior walls 36 surrounding the interior compartment 32. The exterior compartment 31 is thus defined by the combination of the exterior walls 37 and the partition member 33, and the interior compartment 32 is defined by the partition member 33, the interior walls 36 and the rear wall 24 and/or the side walls 22 of the housing 20.

The partition wall member 33 is joined to the air bag 30 by suitable manner such as by stitching, adhesives, melt bonding, etc. The exterior walls 37 may be a continuation of the interior walls 36, as shown in the drawings, or the two compartments 31 and 32 may be attached separately to the partition member 33. When inflated, the partition member 33 forms the rear of the exterior compartment 31 and the front of the interior compartment 32, and provides a secondary impact surface upon deflation of the exterior compartment 31. Disposed generally centrally on the partition member 33 is an orifice 35 which is sized and configured to match or exceed the cross-sectional diameter and configuration of the inflation nozzle 12. Preferably the orifice 35 size and configuration generally match those of the nozzle 12 so that a relatively snug fit is obtained. The orifice 35 provides a conduit for passage of gas between the interior compartment 32 and the exterior compartment 31, but more importantly allows the partition 33 to be positioned rearward of the lateral apertures 14 on the nozzle 12 prior to inflation, such that the nozzle 12 extends into the exterior compartment 31 and all apertures 13 and 14 exit into the exterior compartment 31 during the initial stages of inflation.

Figure 4:
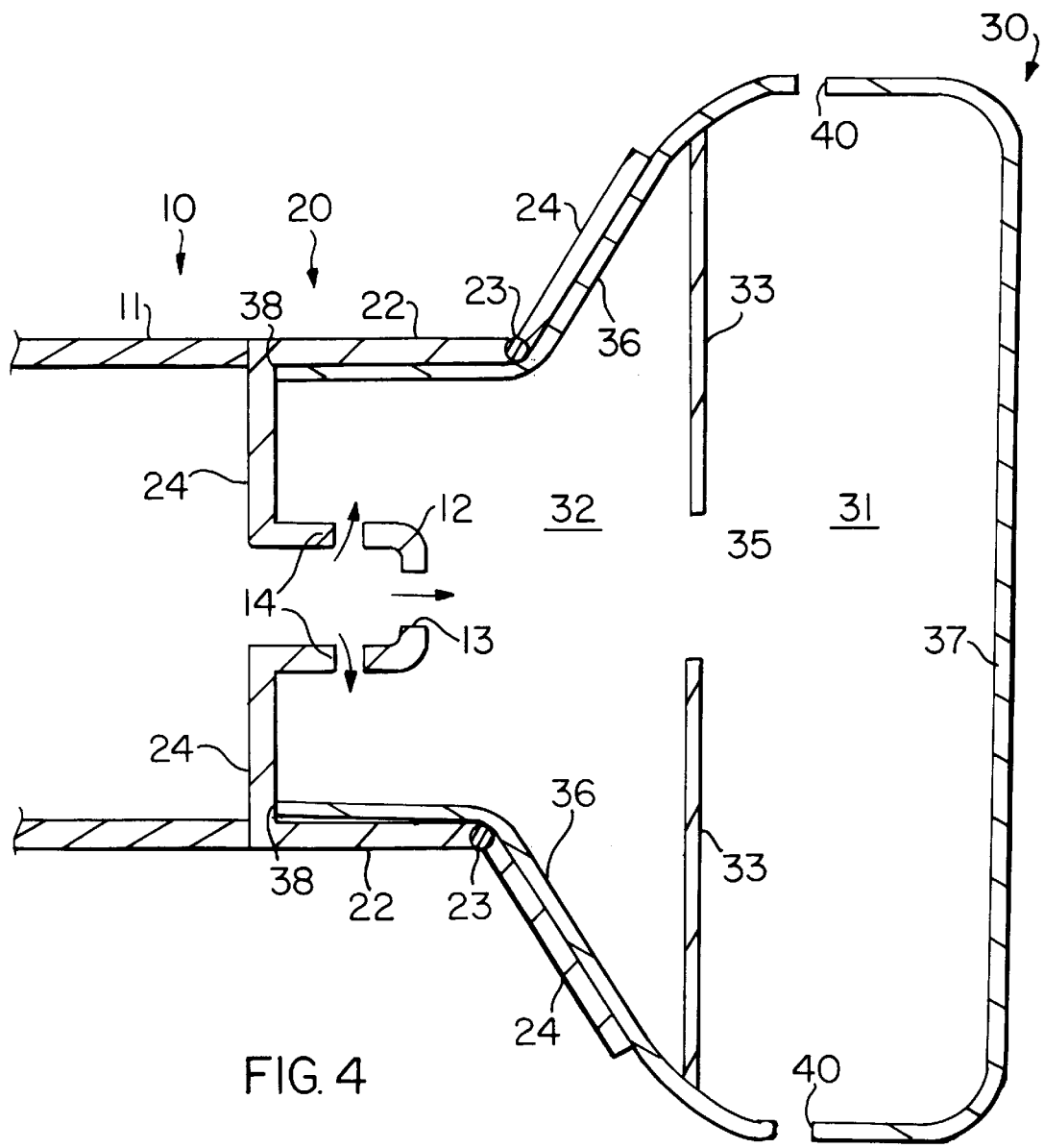
FIG. 4 is a cross-sectional view of the air bag with both the exterior and the interior compartments shown in the fully inflated condition.

In the passive state, the interior walls 36 and exterior walls 37 of the air bag 30 are folded or pleated to occupy a minimal area within the air bag housing 20. The walls 36 and 37 are folded such that the orifice 35 of the partition member 33 is pushed over the inflation nozzle 12 toward the rear wall 24 of the air bag housing 20, at least far enough to clear the lateral apertures 14, with the partition member 33 folded to occupy minimal space, thus allowing the size of the housing 20 to be minimized, as shown in FIG. 1. The panel member 21 is closed so that the housing 20 becomes a closed container for the air bag 30. Upon impact, the inflation gas within the reservoir 11 is released through nozzle 12. Because the nozzle 12 extends through the orifice 35 of the partition member 33, the gas initially flows only into the exterior compartment 31. Exterior compartment 31 is unfolded and expanded outwardly by the pressurized gas, forcing open the panel member 21 and substantially inflating the exterior compartment 32 both forwardly and laterally relatively instantaneously, as shown in FIG. 2. Thus there is a safety cushion occupying the void area in front of the occupant in the earliest moments of impact. As the exterior compartment 31 continues to inflate, as shown in FIG. 3, the partition member 33 is pulled forward until the orifice 35 passes forward of the lateral apertures 14 in the inflation nozzle 12. Pressurized gas is now diverted into the interior compartment 32, slowing the rate of inflation of the exterior compartment 31, unfolding and expanding the interior compartment 32 and pushing the partition orifice 35 beyond and off the nozzle 12. At this point, all the gas is supplied into the interior compartment 32 and the inflation continues until both compartments are fully inflated for maximum protection, as shown in FIG. 4.

The rate of inflation of each compartment 31 and 32 is controlled by the gas flow rate, which is a function of the gas pressure within the reservoir 11 and the size and numbers of the apertures 13 and 14 in the inflation nozzle 12. The relative sizes of the compartments 31 and 32 may vary as a function of the overall dimensions and the positioning of the divider partition member 33. The walls 36 and 37 and the partition member 33 may be formed of different materials, and the partition member 33 may have additional orifices communicating between the two compartments 31 and 32. The partition member 33 may be temporarily attached to he nozzle 12 or the rear wall 24 of the housing 20 by suitable adhesives or mechanical means to resist forward movement of the partition orifice 35 until the exterior compartment 31 has sufficiently inflated. Deflation may be accomplished and controlled in known manner, such as by providing deflation means 40 such as vent ports or rupturable seams which burst when a minimal threshold is exceeded. Inflation of the interior compartment 32 may begin before the exterior compartment 31 is completely inflated, and the rate of deflation of the two compartments 31 and 32 may vary, with the deflation rate of the interior compartment 32 preferably being slower than that of the exterior compartment 31.

It is understood that certain equivalents and substitutions may be obvious to those skilled in the art for elements as set forth above, and therefore the true scope and definition of the invention is to be as set forth in the following claims.

I claim:

1. A vehicle air bag device comprising an inflatable, multiple compartment, air bag having an exterior compartment and an interior compartment, inflation gas, means to deliver said inflation gas to inflate said air bag in the event of a vehicle impact, and a housing to retain said air bag in a deflated state, where said gas delivery means inflates said exterior compartment prior to said interior compartment, where said gas delivery means further comprises a gas inflation nozzle, where said exterior compartment is separated from said interior compartment by a partition member having an aperture, where said aperture in said partition member receives said nozzle such that said nozzle extends through said partition member and into said exterior compartment when said air bag is in the deflated state and retained within said housing, whereby said inflation gas is initially delivered by said nozzle only into said external compartment upon vehicle impact, and where said partition member is pulled off said nozzle when said exterior compartment inflates, such that said nozzle then delivers said inflation gas into said interior compartment.

2. The device of claim 1, where said nozzle comprises a forward aperture and at least one lateral aperture for passage of the inflation gas into said air bag.

3. The device of claim 2, where said air bag further comprises rapid deflation means.

4. A vehicle passenger safety device comprising a multiple compartment, inflatable air bag having an exterior compartment and an interior compartment separated by a partition member, means to deliver inflation gas into said air bag to inflate said exterior compartment prior to said interior compartment, and a housing to retain said air bag in a deflated and folded configuration, said housing having a panel member which opens upon inflation of said air bag, where said gas delivery means comprises a nozzle and where said partition member comprises an aperture, where said nozzle extends through said aperture into said exterior compartment when said air bag is in the deflated and folded configuration within said housing, and where said partition member is pulled off said nozzle when said exterior compartment is inflated, such that said interior compartment is then inflated by gas delivered through said nozzle.

5. The device of claim 4, where said nozzle comprises a forward aperture and at least one lateral aperture, such that when said partition member is pulled past said at least one lateral aperture gas is delivered to said interior compartment while said forward aperture delivers gas to said exterior compartment.

* * * * *